United States Patent [19]

Muryoi

[11] Patent Number: 4,472,031
[45] Date of Patent: Sep. 18, 1984

[54] ZOOM LENS BARREL
[75] Inventor: Takeshi Muryoi, Chigasaki
[73] Assignee: Nippon Kogaku K.K., Tokyo, Japan
[21] Appl. No.: 315,441
[22] Filed: Oct. 27, 1981
[30] Foreign Application Priority Data
   Oct. 30, 1980 [JP] Japan .................................. 55-151493
[51] Int. Cl.³ .......................... G02B 7/10; G02B 15/18
[52] U.S. Cl. .................................................... 350/429
[58] Field of Search ......................................... 350/429
[56] References Cited
   U.S. PATENT DOCUMENTS
   4,273,423  6/1981  Uesugi ................................. 350/429
   4,275,952  6/1981  Uesugi ................................. 350/429
   4,315,670  2/1982  Shigoku .............................. 350/429
   4,340,280  7/1982  Isobe .................................. 350/429

Primary Examiner—John K. Corbin
Assistant Examiner—Rebecca D. Gass
Attorney, Agent, or Firm—Shapiro and Shapiro

[57] ABSTRACT

A zoom lens barrel in which a holding ring for the foremost lens group has a threaded portion for mounting accessories thereon and is capable of movement along the optical axis but is held against rotational movement, so that the orientation of the accessories about the optical axis does not change. An operating ring is coupled to the lens holding ring for movement therewith along the optical axis and is capable of rotating relative to the holding ring. Rectilinear movement of the operating ring along the optical axis moves the holding ring of the foremost lens group and a holding ring of a second lens group for zooming. Rotation of the operating ring causes axial movement of the holding ring of the first lens group and simultaneously causes axial movement of the operating ring itself.

5 Claims, 5 Drawing Figures

ZOOM LENS BARREL

BACKGROUND OF THE INVENTION

1. Field of the Invention

This invention relates to improvements in the zoom lens barrel of a photographic camera, and more particularly to a zoom lens barrel whose forwardmost group lens is slidingly operated in the direction of the optical axis during focusing and/or zooming.

2. Description of the Prior Art

A mount on which accessories such as an optical filter and a lens hood can be mounted is usually provided on the object side end of the objective lens barrel of a camera. This mount is formed integrally with a ring for holding the foremost group lens and the position of the mount is displaced with the movement of the foremost group lens in the direction of the optical axis. The movement of the lens is accomplished by displacing a holding ring by an operating ring provided on the outer periphery of the lens barrel, and if the lens barrel is designed such that the operating ring is moved in the direction of the optical axis, it is preferably, for appearance, that the mount on which accessories are mounted and the operating ring be moved together. Further, among the accessories that may be mounted on the mount is a polarizing filter which has directionality about the optical axis, and therefore it is necessary that the displacement of the mount not involve rotation.

Thus is also known a zoom lens barrel designed to accomplish focusing by rotating operation of a single operating ring about the optical axis and to accomplish zooming by sliding operation of the single operating ring in the direction of the optical axis, but there is no known zoom lens barrel which satisfies the above-mentioned two conditions.

SUMMARY OF THE INVENTION

It is a primary object of the present invention to provide a zoom lens barrel which is improved in operability and performance of each member in relative movement during the operation thereof.

It is another object of the present invention to provide improvements in a zoom lens barrel having a single operating ring for both focusing and zooming.

It is still another object of the present invention to provide a zoom lens barrel capable of focusing and/or zooming without involving rotation of the foremost lens group and having an operating ring movable in the direction of the optical axis with the foremost lens group.

The invention will become fully apparent from the following detailed description of some embodiments thereof taken in conjunction with the accompanying drawings.

DESCRIPTION OF THE PREFERRED EMBODIMENTS

Figure 1:
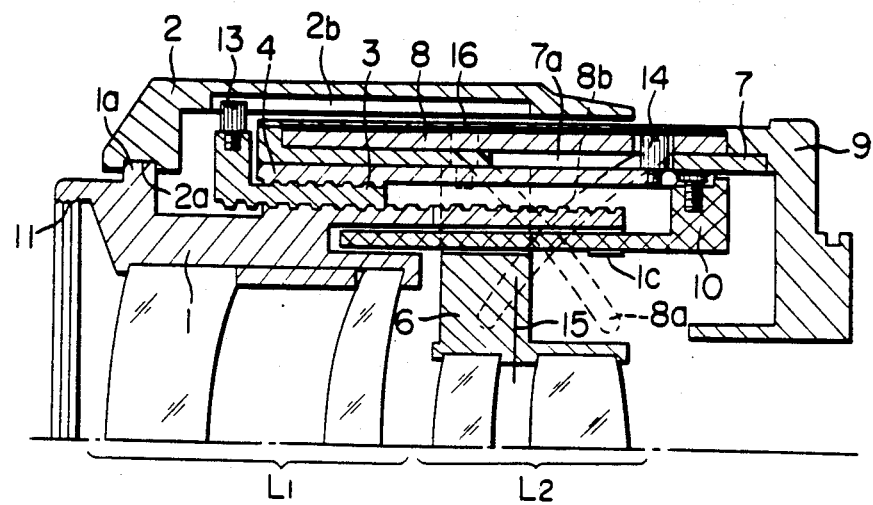
FIG. 1 is a longitudinal cross-sectional view showing an embodiment of the present invention.
Figure 2:
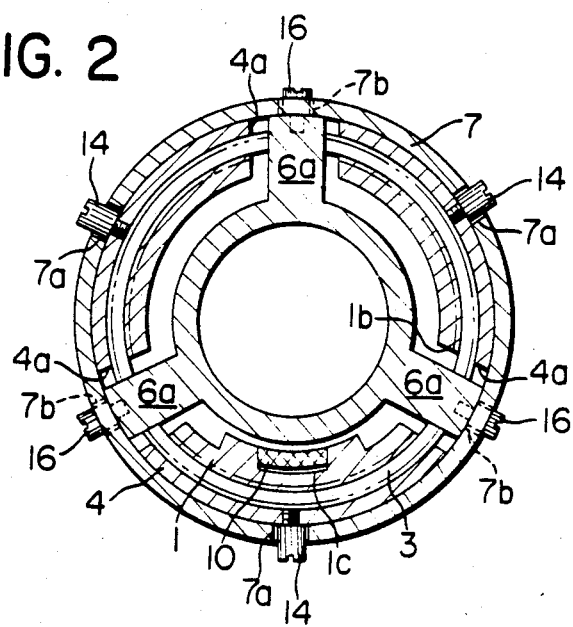
FIG. 2 is a transverse cross-sectional view of the same embodiment.

Referring to FIGS. 1 and 2, a forward group lens $L_1$ acting on both zooming and focusing is held by a holding ring 1 having at one end thereof a threaded portion 11 for mounting an accessory thereon. Ring 1 is coupled to an outer operating ring 2 by the engagment between a flanged portion 1a and an annular groove 2a so as to permit relative rotation between rings 1 and 2. A rearward group lens $L_2$ operable with the forward group lens $L_1$ during zooming is held by a holding ring 6. In accordance with the invention, for purposes which will be apparent hereinafter, drive means, including an intermediate ring 3 and a moving ring 4 in the present embodiment, is provided for moving the holding ring 1 along the optical axis in response to rotation of operating ring 2 and for simultaneously moving operating ring 2 along the optical axis. As shown, intermediate ring 3 is threadedly engaged with the outer side of holding ring 1, and moving ring 4 is threadedly engaged with the outer side of intermediate ring 3. As will be explained more fully later, second drive means is provided for moving the holding ring 6 along the optical axis in response to rectilinear movement of the operating ring along the optical axis. In the present embodiment, the latter drive means comprises cams means (including a cam cylinder 8) coupled to holding ring 6 and means for transmitting axial displacement of the intermediate ring to the cam means.

As is best seen in FIG. 2, holding ring 1 and the moving ring 4 are formed with radially extending cut-aways 1b and 4a at three locations forming 120° with one another, and the arms 6a of the holding ring 6 are fitted in these cut-aways. A key member 10 fixed to the moving ring 4 is fitted in a straight groove 1c extending in the direction of the optical axis and formed in the holding ring 1.

A cam cylinder 8 provided with cam slots 8a and 8b is disposed between a first fixed cylinder 9 and a second fixed cylinder 7 provided with three straight guide grooves 7a extending in the direction of the optical axis. The moving ring 4 is movable only in the direction of the optical axis relative to the fixed cylinder 7, as will hereinafter be described. The two fixed cylinders 7 and 9 are made integral with each other, and the cam cylinder 8 is only rotatable relative to these.

Three guide pins 14 and 16 are studded in the moving ring 4 and the arms 6a of the holding ring 6, respectively. The pins 14 and 16 extend through straight slots 7a and 7b, respectively, and the free ends thereof are engaged with the cam slots 8a and 8b. A focusing transmitting pin 13 studded in the outer peripheral surface of the intermediate ring 3 is engaged with a straight groove 2b formed in the inner peripheral surface of the operating ring 2. A conventional diaphragm mechanism having a diaphragm blade 15 is provided on the holding ring 6.

Operation of the present embodiment will now be described.

In the case of zooming, when the operating ring 2 is moved back and forth in the direction of the optical axis without being rotated, the holding ring 1, carrying the forward group lens $L_1$, is moved back and forth therewith and the moving ring 4 is also moved back and forth through the agency of the intermediate ring 3 without being rotated. During the movement of the moving ring 4, the cam cylinder 8 is rotated due to the engagement between the pin 14 and the cam slot 8b, and therefore the holding ring 6, carrying the rearward group lens $L_2$, is moved back and forth without being rotated due to the engagement of the straight groove 7b and cam slot 8a with the pin 16. In this operation, the amounts of movement of the forward and rearward group lenses $L_1$ and $L_2$ differ from each other and the spacing therebetween varies. In this manner, zooming is accomplished.

When the operating ring 2 is rotated after completion of zooming, the intermediate ring 3 is rotated due to the engagement between the key groove 2b and the pin 13, but since the key groove 1c and the key member 10 are in engagement with each other, the holding ring 1, carrying the forward group lens $L_1$, is moved back and forth without being rotated (the operating ring 2 is also moved back and forth therewith), and thus, focusing is accomplished. In this operation, the moving ring 4 does not move and accordingly, the rearward group lens $L_2$ does not move back and forth.

In the present embodiment, zooming is accomplished by the operating ring 2 being moved leftwardly as viewed in FIG. 1, and focusing in the macro area is accomplished by this ring 2 being rotated about the optical axis. Moreover, both during focusing and during zooming, the forward group lens $L_1$ and its holding member 1 are axially moved with the operating ring 2 without being rotated.

Figure 3:
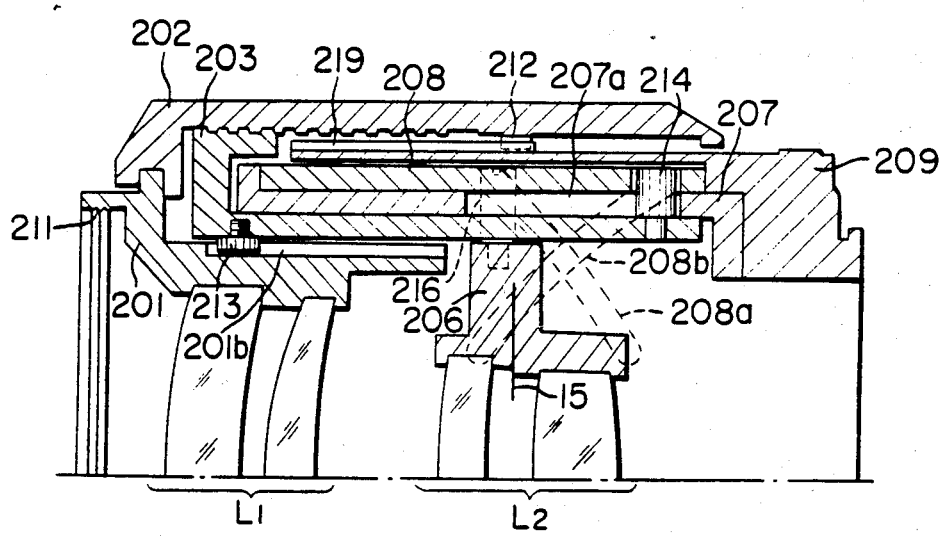
FIG. 3 is a longitudinal cross-sectional view showing another embodiment of the present invention.

FIG. 3 shows a second embodiment of the present invention.

A holding ring 201 having a threaded portion 211 for mounting an accessory thereon is coupled to an operating ring 202 so as to permit relative rotation as in the embodiment of FIG. 1, and is provided with a straight key groove 201b extending in the direction of the optical axis. An intermediate ring 203 having a pin helicoid 213 engaged screw with the key groove 201b is in mesh engagement (by helicoid screw threads) with the inner periphery of the operating ring 202. A cam cylinder 208 rotatably supported between a first fixed cylinder 209 and a second fixed cylinder 207 has cam slots 208a and 208b, and a pin 214 studded in the intermediate ring 203 is inserted into the cam slot 208b through a straight groove 207a formed in the fixed cylinder 207. A pin 216 studded in a holding ring 206 is inserted into the cam slot 208a through another straight groove (not shown) extending in the direction of the optical axis and formed in the fixed cylinder 207. A distance limiting projection 212 is provided on the inner peripheral side of the operating ring 202. A limiting plate 219 is secured to the fixed cylinder 209.

Figure 4:
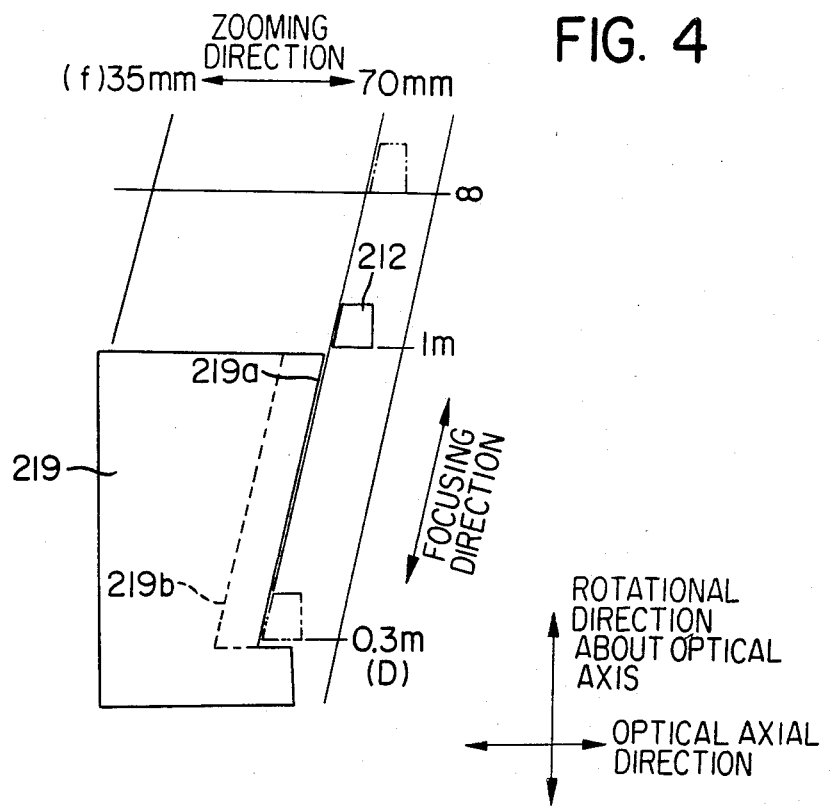
FIG. 4 illustrates the operation of the FIG. 3 embodiment.

The distance limiting projection 212 and the limiting plate 219 are in such a relation as shown in FIG. 4 with respect to zooming and focusing. That is, (1) when the focal length f=70 mm, focusing is possible up to the object distance D=∞-0.3 m, and once focusing is effected to D=1-0.3 m, zooming becomes impossible, and (2) when focusing is effected to D=∞-1 m, zooming is possible in the range of the total focal length f=70-35 mm.

When the operating ring 202 is moved forth or back in the direction of the optical axis, the intermediate ring 203 and the holding ring 201 are rectilinearly moved together in the direction of the optical axis. On the other hand, the cam cylinder 208 rotates in accordance with the shape of the cam slot 208b and the pin 216 moves rectilinearly in the direction of the optical axis. Thus, the holding ring 206 moves rectilinearly in the direction of the optical axis. Accordingly, the rectilinear movement of the operating ring 202 in the direction of the optical axis causes rectilinear movement of the forward group lens $L_1$ and the rearward group lens $L_2$ in the direction of the optical axis and a variation in the relative position between the two, thereby enabling zooming.

Next, the operating ring 202 is rotated about the optical axis. Since the intermediate ring 203 does not rotate, the operating ring 202 moves rectilinearly in the direction of the optical axis by an amount corresponding to the lead of the helicoid screw threads between ring 202 and 203 while rotating. At this time, the holding ring 201 is rectilinearly guided by the pin 213 and key groove 201b, and therefore only the axial displacement of the operating ring 202 is transmitted to the holding ring 201. Thus, the holding ring 201 moves the forward group lens $L_1$ rectilinearly in the direction of the optical axis. This is the focusing operation.

Now, the actions of the distance limiting projection 212 and the limiting plate 219 will be fully described by referring to the above-described operation. Assuming that the operating ring 202 is set to D=∞-1 m, the projection 212 and the limiting plate 219 are in non-interfering condition with respect to the movement in the direction of the optical axis, and therefore the operating ring 202 is free to move rectilinearly in the direction of the optical axis with the projection 212. Therefore, the focal length from f=70 mm to f=35 mm can be freely selected.

On the other hand, when the focal length has been set to a value shorter than f=70 mm by this operation, the projection 212 and the limiting plate 219 are in interfering condition with respect to the rotational direction about the optical axis at D=1 m, and therefore rotation of the operating ring 202 is permitted only between D=∞-1 m and focusing up to the macro region (D=1-0.3 m) is impeded by the engagement between the projection 212 and the limiting plate 219.

In order to enable the focusing up to the macro region, the operating ring 202 may be moved in the direction of the optical axis to bring about f=70 mm, and the projection 212 and the limiting plate 219 are brought into non-interfering condition with respect to the rotation about the optical axis, whereafter the operating ring may be rotated. Thereupon, the projection 212 moves along the inclinded surface 219a of the limiting plate in accordance with the rotation of the operating ring. The inclinded surface 219a is provided to provide an escape to the limiting plate 219 by the amount of rectilinear movement of the operating ring, namely, the projection 212, in the direction of the optical axis caused by the rotation of the operating ring 202 and thereby secure the non-interfering condition of the projection 212 and the limiting plate 219.

In this manner, focusing in the macro region becomes possible and, at D=1-0.3 m, the projection 212 and the limiting plate 219 are in interfering condition with respect to the direction of the optical axis and therefore, zooming in the macro region is impeded.

Figure 5:
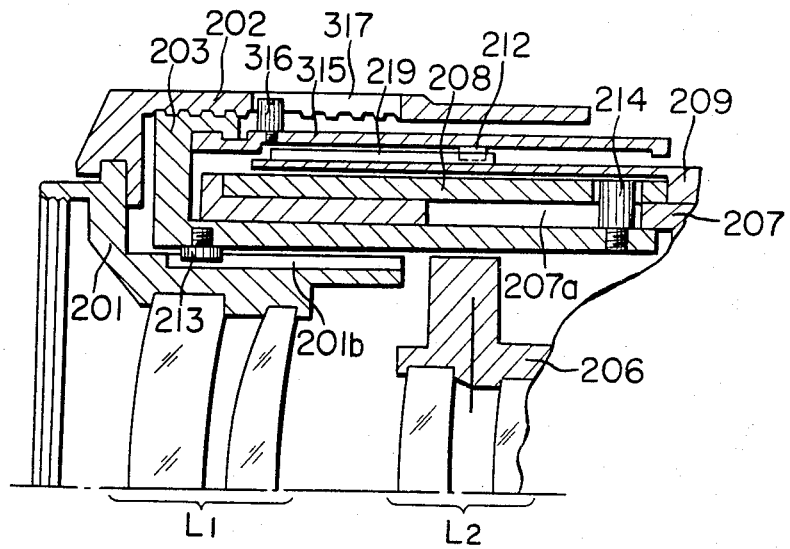
FIG. 5 is a longitudinal cross-sectional view showing still another embodiment of the present invention.

FIG. 5 shows still another embodiment of the present invention in which the movement of the distance limiting projection 212 in the direction of the optical axis during focusing by rotation of the operating ring 202 is eliminated. In FIG. 5, members similar in function to those of FIG. 3 are given similar refernce numerals and need not be described.

A sliding ring 315 is fitted to the intermediate ring 203 for free rotation and for movement in the direction of the optical axis with the latter. The distance limiting projection 212 is secured to the sliding ring 315. A pin 316 studded in the ring 315 is inserted into a straight key groove 317 formed in the operating ring.

When the operating ring 202 is rectilinearly moved for zooming as previously described, the holding ring 201, the intermediate ring 203 and the sliding ring 315 move rectilinearly in the direction of the optical axis. Also, when the operating ring 202 is rotated for focusing, it moves rectilinearly by an amount corresponding to the lead of the helicoid screw. However, the intermediate ring 203 does not rotate, and therefore the sliding ring 315 has only its rotation transmitted by the key groove 317 and the pin 316, and the rectilinear movement of the operating ring 202 is absorbed by the key groove 317 and is not transmitted to the ring 315. The limiting projection 212 does not move rectilinearly in the direction of the optical axis during rotation of the operating ring 202 as in the embodiment of FIG. 3. Therefore, the necessity of providing an inclined surface 219a on the limiting plate 219 is eliminated.

According to the above-described embodiments, the forward group holding ring does not rotate during zooming and focusing, and therefore when a polarizing filter or the like is attached to an accessory mounting screw 11 or 211, the characteristic of the light beam reaching the finder system and the exposure system does not vary during focusing and zooming or thereafter.

I claim:

1. A zoom lens barrel comprising:
   (a) optical means including first lens means and second lens means and capable of focusing by movement of said first lens means along the optical axis and zooming by movement of the first and second lens means along the optical axis;
   (b) an operating ring member capable of rotation about the optical axis and of movement along the optical axis;
   (c) a first holding member for holding said first lens means, said first holding member being restrained from rotation about the optical axis and having means for coupling said first holding member to said operating ring member for movement therewith along the optical axis but permitting said operating ring member to rotate relative to said first holding member;
   (d) first drive means for moving said first holding member along the optical axis in response to rotation of said operating ring member and for simultaneously moving said operating ring member along said optical axis;
   (e) a second holding member for holding said second lens means; and
   (f) second drive means for moving said second holding member along the optical axis in response to rectilinear movement of said operating ring member along the optical axis.

2. A zoom lens barrel according to claim 1, wherein said first drive means includes:
   an intermediate member having means for coupling the intermediate member to said operating ring member for rotation therewith but permitting relative movement of said operating ring member and said intermediate member along the optical axis, said intermediate member being threadedly engaged with said first holding member; and
   a member threadedly engaged with said intermediate member and restrained from rotation about the optical axis.

3. A zoom lens barrel according to claim 1, wherein said first drive means includes:
   an intermdiate member having means for coupling said intermediate member to said first holding member to permit said first holding member to move relative to said intermediate member along the optical axis but to prevent rotation to said first holding member relative to said intermediate member, said intermediate member being threadedly engaged with said operating ring member; and
   means for restraining the rotation of said intermediate member.

4. A zoom lens barrel according to claim 1, wherein said first drive means includes an intermediate member threadedly engaged with one of said operating ring member and said first holding member and having means for coupling said intermediate member to the other of said operating ring member and said first holding member to permit movement of said other along the optical axis relative to said intermediate member but to prevent rotation of said other relative to said intermediate member.

5. A zoom lens barrel according to claim 4, wherein the threaded engagement of said intermediate member with one of said operating ring member and said first holding member causes said intermediate member to be displaced along the optical axis when said operating ring member is moved along the optical axis rectilinearly, and wherein said second drive means includes:
   cam means coupled to said second holding member; and
   means for transmitting the displacement of said intermediate member to said cam means.

* * * * *